(12) United States Patent
Van Cauwenberghe

(10) Patent No.: US 11,220,019 B2
(45) Date of Patent: Jan. 11, 2022

(54) AUTOMATIC BREAD SLICER

(71) Applicant: JAC S.A., Liège (BE)

(72) Inventor: Baudouin Van Cauwenberghe, Liège (BE)

(73) Assignee: JAC S.A., Liège (BE)

( * ) Notice: Subject to any disclaimer, the term of this patent is extended or adjusted under 35 U.S.C. 154(b) by 0 days.

(21) Appl. No.: 16/505,948

(22) Filed: Jul. 9, 2019

(65) Prior Publication Data

US 2020/0009756 A1 Jan. 9, 2020

(51) Int. Cl.
*B26D 7/22* (2006.01)
*B26D 1/11* (2006.01)
*B26D 7/06* (2006.01)
*B26D 7/24* (2006.01)
*G01V 8/12* (2006.01)
*G01V 8/20* (2006.01)

(52) U.S. Cl.
CPC ............. *B26D 7/225* (2013.01); *B26D 1/11* (2013.01); *B26D 7/0608* (2013.01); *B26D 7/0641* (2013.01); *B26D 7/24* (2013.01); *G01V 8/12* (2013.01); *G01V 8/20* (2013.01); *B26D 2210/06* (2013.01)

(58) Field of Classification Search
CPC ... Y10T 83/081; Y10T 83/088; Y10T 83/101; Y10T 83/141; Y10T 83/148; Y10T 83/2211; Y10T 83/4501; Y10T 83/4506; Y10T 83/461; Y10T 83/463; Y10T 83/4691; Y10T 83/525; Y10T 83/531; Y10T 83/533; Y10T 83/549; Y10T 83/544; Y10T 83/647; Y10T 83/6491; Y10T 83/6584; Y10S 83/932; B26D 1/11; B26D 7/0608; B26D 7/0641; B26D 7/225; B26D 7/22; B26D 7/24; G01V 8/12; G01V 8/20
See application file for complete search history.

(56) References Cited

U.S. PATENT DOCUMENTS 4,111,087 A * 9/1978 Pankratz ................ B26D 1/553
198/781.02
6,230,598 B1 * 5/2001 Ressler .................... B26D 1/30
30/179

(Continued)

FOREIGN PATENT DOCUMENTS

EP 1647374 A2 4/2006
EP 2039483 A1 3/2009

*Primary Examiner* — Phong H Nguyen
(74) *Attorney, Agent, or Firm* — Browdy and Neimark, PLLC

(57) ABSTRACT

A device and a method for cutting a loaf of bread in slices having an input compartment adjacent to a set of parallel oblong blades which can be driven back and forth in their longitudinal direction. A pusher movable between a retracted position in relation to the blades and an end cutting position pushes the bread through the blades. A detector is provided to detect the presence of an object in the access opening of an input compartment which cooperates with the blades' drive to stop the movement of the blades when the presence of an object in the access opening is detected. When the presence of an object in the access opening is detected while the pusher is in its retracted position, the movement of the blades starts and the pusher will be moved from its retracted position to the end cutting position when the object is no longer detected in the access opening.

17 Claims, 1 Drawing Sheet

(56) References Cited

U.S. PATENT DOCUMENTS

| | | | |
|---|---|---|---|
| 2005/0211040 A1* | 9/2005 | Bilskie | B26D 1/18 |
| | | | 83/485 |
| 2008/0196600 A1* | 8/2008 | Culling | B26D 7/01 |
| | | | 99/491 |
| 2009/0078009 A1* | 3/2009 | Docking | B62H 5/14 |
| | | | 70/15 |
| 2009/0241748 A1* | 10/2009 | Keller | B27G 19/02 |
| | | | 83/522.13 |
| 2010/0215789 A1 | 8/2010 | Willett | |
| 2011/0056352 A1* | 3/2011 | Van Cauwenberghe | |
| | | | B26D 5/00 |
| | | | 83/74 |
| 2012/0085216 A1* | 4/2012 | Lobbia | B26D 5/14 |
| | | | 83/821 |

* cited by examiner

AUTOMATIC BREAD SLICER

The invention concerns a bread slicer, in particular a device for cutting bread into slices with an input compartment adjacent to a set of blades comprising parallel oblong blades that can be driven back and forth in their longitudinal direction. A mobile pusher is provided in the input compartment. This pusher can be moved between a retracted position in relation to the set of blades and an end cutting position. Thus, the pusher allows a loaf of bread to be pushed through the set of blades to cut the loaf into slices while the blades are being driven. The input compartment is accessible through an access opening for placing a loaf of bread to be sliced in the input compartment between the set of blades and the pusher when the latter is in the retracted position. The slicer includes detection means to detect the presence of an object in the access opening. These detection means cooperate with the set of blades to stop the blades from moving when the presence of an object in the access opening is detected by the detection means while the blades are being driven back en forth.

These slicers are mainly used in stores where a customer chooses a loaf of bread and puts it in an input compartment of the slicer to slice the loaf. The set of blades forms a wall of this compartment that is accessible through an open access opening. Thus, detection means are provided which ensure that the movement of the blades is stopped when an object, such as a person's hand, is detected in the access opening.

In other slicers, according to the previous art, a cover is provided that closes the access opening while a loaf of bread is being cut into slices. For safety reasons, the cover cannot be opened until the cutting of the loaf is finished, or the movement of the blades is immediately stopped when the cover is opened.

The advantage of slicers with an access opening without a lid is that less operations are required to cut a loaf of bread and therefore cutting a loaf of bread takes less time than with a slicer with a lid.

The aim of the invention is, therefore, to propose a device for automatically cutting a loaf of bread that requires less operations and therefore allows a greater number of loaves to be cut per unit of time.

To this end, the detection means cooperate with the drive of the set of blades and with the drive of the pusher so that, when the presence of an object in the access opening is detected by the detection means while the pusher is in the retracted position, the movement of the blades is triggered and the pusher is moved from its retracted position to the end cutting position as soon as the object is no longer detected in the access opening by the detection means.

Advantageously, the detection means allow to generate at least one electromagnetic beam extending in or opposite the plane of the access opening, the detection means comprising at least one optical sensor for detecting the interruption of the beam when there is an object in the access opening.

Preferably, the detection means comprise a transmitter and a receiver, the transmitter having a light source for generating at least one light beam which passes through the access opening to the receiver. The presence of an object in the access opening will be detected when the light beam does not reach the receiver.

According to an interesting embodiment of the device according to the invention, the detection means present a light curtain formed by light beams passing through the access opening and extending preferably parallel to each other.

The invention also concerns a method for automatically cutting a loaf of bread into slices with a bread slicer having an input compartment adjacent to a set of blades including parallel oblong blades. The slicer has a pusher in the input compartment that can be moved between a retracted position in relation to the set of blades and an end cutting position, and which allows a loaf of bread to be pushed through the set of blades while the blades are being driven back en forth in their longitudinal direction.

This method is characterized in that the presence of an object in the access opening is detected and, when an object is detected while the blades are stationary and the pusher is in its retracted position, the movement of the blades and the movement of the pusher towards the end cutting position will be triggered to slice a loaf of bread as soon as the presence of the object in the opening is no longer detected.

Further details and particularities of the invention will become clear from the description given below, by way of a non-limiting example, of some particular embodiments of the device and the method according to the invention, with reference to the accompanying drawings.

In the different figures, the same reference figures refer to similar or identical elements.

Figure 1:
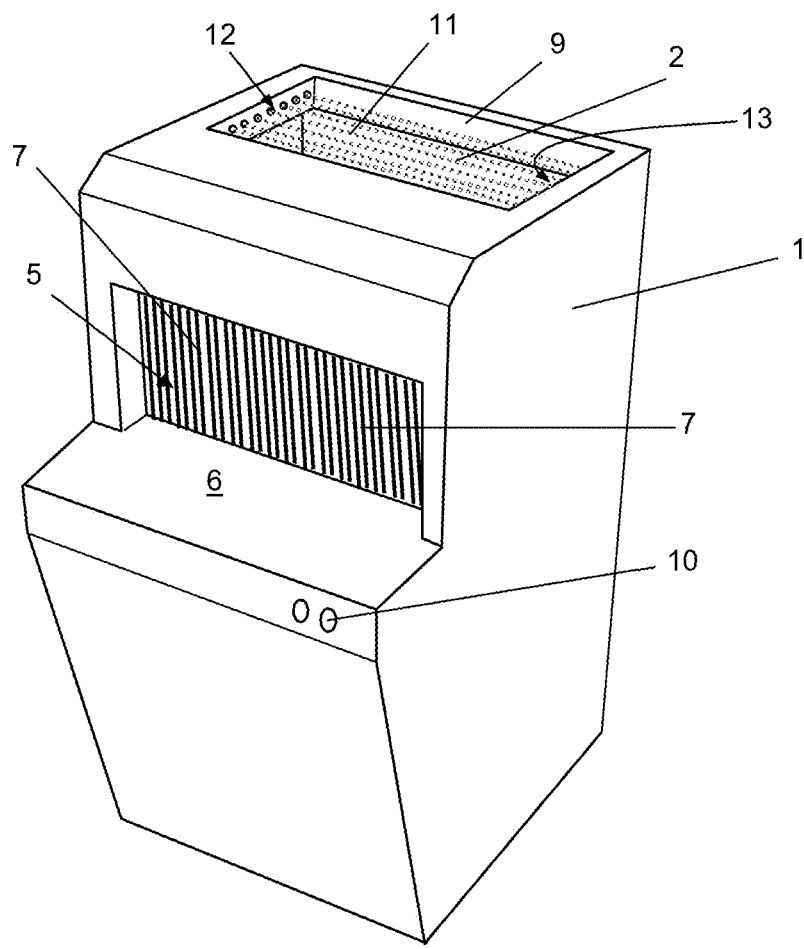
FIG. 1 is a schematic view in perspective of a slicer according to the invention with an open access opening.

The device according to the invention, as shown in the figures, forms a bread slicer comprising a frame 1 with an input compartment 2. A loaf of bread 3 to be sliced is introduced in the input compartment 2 and is moved by means of a pusher 4 through a set of blades 5 to an output table 6. The set of blades 5 is adjacent to the input compartment 2 and is part of a wall of this compartment 2. As it is moved through the set of blades 5, the loaf of bread 3 is cut into slices. The set of blades 5 generally includes oblong blades 7 arranged parallel to each other which can be moved back and forth in their longitudinal direction.

The input compartment 2 has a substantially flat inclined base 8 on which a loaf of bread 3 can be placed to be cut into slices. The loaf of bread 3 is introduced in the input compartment 2 through an access opening 9.

Figures 2, 3:
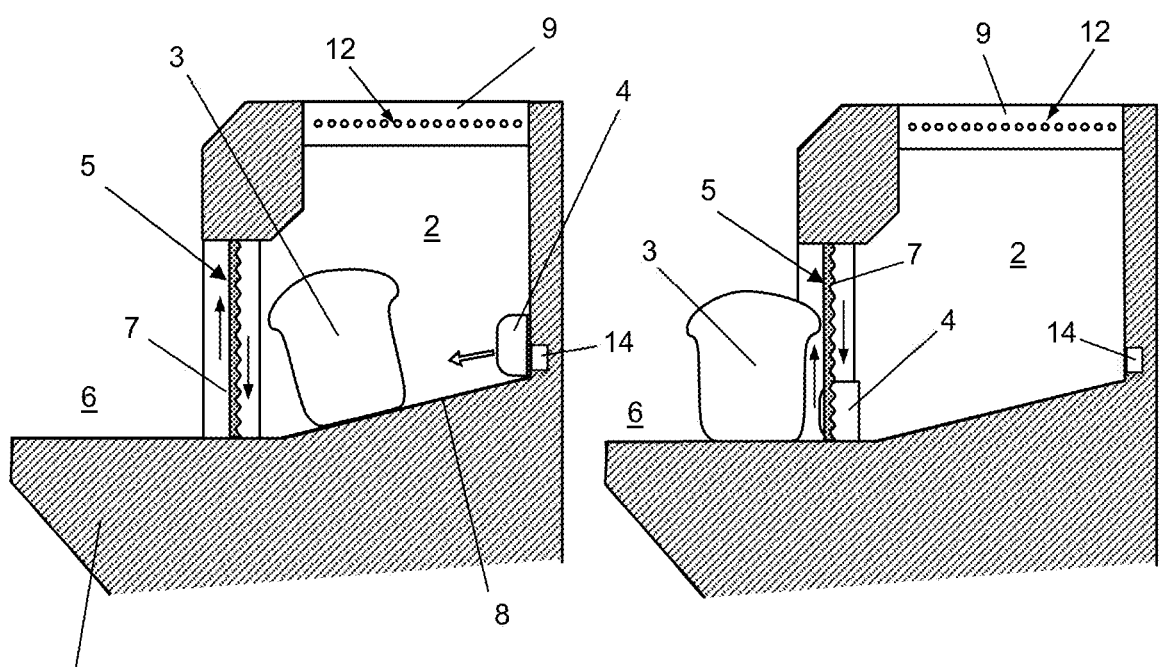
FIG. 2 is a cross section along line I-I of FIG. 1, showing the pusher in its retracted position.
FIG. 3 is a cross section along line I-I in FIG. 1, showing the pusher in its end cutting position.

The pusher 4 is provided in the input compartment 2 and can be moved between a retracted position in relation to the set of blades 5, as shown in FIG. 2, and an end cutting position which is illustrated in FIG. 3. In the retracted position, the pusher 4 is adjacent to the wall of the input compartment 2 opposite to the set of blades 5.

To allow the loaf of bread to be cut, it is important that it is placed between the set of blades 5 and the pusher 4. As soon as a loaf of bread 3 to be cut is placed between the pusher 4, which is in the retracted position, and the set of blades 5, a button 10 is pressed to start the cutting of the loaf of bread 3. The loaf of bread 3 is then advanced by the pusher 4 to the set of blades 5, and by the action of the pusher 4, the loaf of bread 3 is moved through the set of blades 5 whose blades are moved back and forth, thus forming the slices of bread 3. When the loaf of bread has completely passed through the set of blades 5, the pusher 4 will be in the end cutting position, as shown in FIG. 3, and the cut loaf can be retrieved from the output table 6.

When the cutting of the loaf of bread 3 is finished, when it has completely passed through the set of blades 5, the pusher 4 is moved back from the end cutting position to the retracted position, and the movement of the blades 7 is stopped.

Since the access opening 9 remains open at all times and, in particular, when the blades 7 are moving to cut a loaf of bread, a safety system is provided to ensure that the movement of the blades 7 and the displacement of the pusher 4 are stopped immediately when a person introduces an object, such as a hand, in the input compartment 2.

This security system includes detection means to detect the presence of an object in the access opening 9. As soon as an object is detected in the access opening 9 while the blades 7 are being driven back and forth, the detection means will send a signal to the drive of the set of blades 5 to stop the movement of the blades 7. Preferably, the displacement of the pusher 4 is also stopped when an object is detected in the access opening 9. Thus, it is ensured that it is not possible to make contact with the oscillating blades 7 with the hand through the access opening 9.

As soon as the object has been removed from the access opening 9, the slicer can be started by pressing the button 10 provided for this purpose.

The detection means in particular make it possible to generate at least one electromagnetic beam 11 extending in the plane of the access opening 9 or parallel to this opening 9, or opposite the opening 9. When the beam is intersected by an object in the access opening 9, the movements of the blades 7 and the pusher 4 are stopped. The detection means therefore include at least one optical sensor to detect the interruption of the beam 11 when there is an object in the access opening 9.

The detection means can include a transmitter 12 and a receiver 13. The transmitter has at least one light source to generate at least one light beam 11 that passes through the opening 9. The presence of an object in the access opening 9 will be detected when the beam 11 does not reach the receiver 13.

The detection means have, for example, a light curtain formed by light beams 11 passing through the access opening and extending in a plane, preferably parallel to each other, as shown in FIG. 1.

According to the invention, the presence of detection means, in particular the light curtain, is also used to automatically start cutting a loaf of bread 3 as soon as it has been placed in the input compartment 2. To this end, the detection means cooperate with the drive of the set of blades 5 and with the drive of the pusher 4.

As soon as a loaf of bread 3 has been cut, the movement of the blades 7 is stopped and the pusher 4 is returned to its retracted position so as to receive a new loaf of bread 3 to be cut. This new loaf of bread 3 is placed by hand on the base 8 through the access opening 9 so that the detection means detect the presence of an object in the access opening 9 until the hand is removed from the input compartment 2. When the detection means no longer detect any object in the access opening 9, the cutting of the loaf of bread 3 is started automatically by moving the pusher 4 to the end cutting position and by driving the blades 7 back and forth.

Thus, according to the invention, the detection means cooperate with the drive of the set of blades 5 and with the drive of the pusher 4 so that, when the presence of an object in the access opening 9 is detected by the detection means while the pusher 4 is in its retracted position, the movement of the blades 7 is triggered and the pusher 4 is moved from its retracted position to the end cutting position as soon as the object is no longer detected in the access opening 9 by the detection means.

Thus, it is not necessary to push a button or perform any other operation after the loaf of bread 3 has been placed in the input compartment 2 to start cutting the loaf of bread 3.

Preferably, the detection means also cooperate with a position sensor 14 to detect the presence of the pusher in its retracted position. This sensor 14 therefore makes it possible to check whether the pusher 4 is in its retracted position before driving the blades 7 and moving the pusher towards the end cutting position.

The invention is of course not limited to the embodiments described above and represented in the accompanying figures; on the contrary, many other variants could be considered while still remaining within the scope of the invention.

Thus, the detection means need not necessarily include one or more light beams; also other ways may be envisaged to detect the presence of an object in the access opening.

The invention claimed is:

1. A device for cutting a loaf of bread in slices comprising:
    an input compartment adjacent to a set of blades comprising parallel oblong blades which can be driven back and forth in their longitudinal direction by a drive,
    a pusher provided in the input compartment, said pusher being movable between a retracted position in relation to the set of blades and an end cutting position and allowing to push a loaf of bread through the set of blades,
    an access opening defined in the device to allow access to the input compartment for placing a loaf of bread to be cut in the input compartment between the set of blades and the pusher when the pusher is in the retracted position,
    a detector for detecting a presence of an object in the access opening, the detector cooperating with the drive of the set of blades to stop movement of the blades when presence of an object in the access opening is detected by the detector while the blades are being driven back and forth,
    wherein the detector cooperates with the drive of the set of blades and with a drive of the pusher in such a way that, if the presence of an object in the access opening is detected by the detector while the pusher is in the retracted position, then the movement of the blades is automatically triggered and the pusher is automatically moved from the retracted position to the end cutting position at the moment when the object is no longer detected in the access opening by the detector.

2. The device according to claim 1, wherein the detector enables at least one electromagnetic beam extending into the access opening or opposite the access opening, the detector comprising at least one optical sensor for detecting interruption of the beam when there is an object in the access opening.

3. The device according to claim 2, wherein the detector comprises a transmitter and a receiver, the transmitter having a light source for generating at least one light beam which passes through the access opening to the receiver, wherein presence of an object in the access opening is detected when the beam does not reach the receiver.

4. The device according to claim 2, wherein the detector has a light curtain formed by light beams passing through the access opening and extending preferably parallel to one another.

5. The device according to claim 2, comprising a position sensor to detect a presence of the pusher in the retracted position.

6. The device according to claim 2, wherein the detector includes at least one photoelectric cell.

7. The device according to claim 1, wherein the detector comprises a transmitter and a receiver, the transmitter having a light source for generating at least one light beam which passes through the access opening to the receiver, wherein presence of an object in the access opening detected when the beam does not reach the receiver.

8. The device according to claim 7, wherein the detector includes at least one photoelectric cell.

9. The device according to claim 1, wherein the detector has a light curtain formed by light beams passing through the access opening.

10. The device according to claim 9, wherein the light curtain formed by light beams extends parallel to one another.

11. The device according to claim 1, comprising a position sensor to detect a presence of the pusher in the retracted position.

12. The device according to claim 1, wherein the input compartment comprises a base which is inclined towards the set of blades so as to facilitate movement of a loaf of bread placed on the base towards the set of blades.

13. The device according to claim 1, wherein the detector includes at least one photoelectric cell.

14. A method for automatically cutting a loaf of bread into slices by a bread slicer having an input compartment adjacent to a set of blades comprising parallel oblong blades, wherein a pusher is provided in the input compartment, the pusher being movable between a retracted position in relation to the set of blades and an end cutting position and allowing a loaf of bread to be pushed through the set of blades by displacement of the pusher from the retracted position to the end cutting position while the blades are being driven back and forth in a longitudinal direction, the input compartment being accessible via an access opening for placing a loaf of bread to be cut into slices in the input compartment, the method comprising:
 detecting a presence of an object in the access opening, and
 if an object is detected in the access opening while the blades are stationary and the pusher is in the retracted position, then triggering movement of the blades and movement of the pusher at the moment when the presence of the object in the opening is no longer detected to cut a loaf of bread into slices.

15. The method according to claim 14, wherein light beams are generated which extend into or opposite the access opening to form a light curtain, the presence of an object in the access opening being detected as interruption of at least one of the beams by the object is detected.

16. The method according to claim 15, comprising detecting whether the pusher is in the retracted position.

17. The method according to claim 14, comprising detecting whether the pusher is in the retracted position.

* * * * *